United States Patent [19]

Aoshima et al.

[11] Patent Number: 4,983,685

[45] Date of Patent: Jan. 8, 1991

[54] METHODS FOR PRODUCTION OF CROSSLINKED RUBBER PRODUCTS

[75] Inventors: Masashi Aoshima; Hironobu Shigematu; Mitsuhiko Sato, all of Ibaraki, Japan

[73] Assignee: Sumitomo Chemical Company, Limited, Osaka, Japan

[21] Appl. No.: 58,283

[22] Filed: Jun. 4, 1987

[30] Foreign Application Priority Data

Jun. 10, 1986 [JP] Japan ................................. 61-134000

[51] Int. Cl.$^5$ ........................... C08K 5/21; C08K 5/37; C08K 5/39; C08K 5/40

[52] U.S. Cl. ................................. 525/331.8; 525/106; 525/329.2; 525/329.7; 525/329.8; 525/330.4; 525/330.5; 525/332.5; 525/332.6; 525/332.8; 525/332.9; 525/333.2; 525/333.1; 525/333.3; 525/345; 525/350; 525/351; 525/379; 525/383; 525/451; 525/474; 525/479; 525/375

[58] Field of Search .................. 525/331.7, 375, 106, 525/451, 387, 326, 330.5, 330.4, 331.8, 332.5, 332.6, 332.8, 332.9, 331.1, 333.2, 333.3, 343, 345, 346, 351, 328.3, 379, 383, 329.2, 332.1, 474, 479, 329.7

[56] References Cited

U.S. PATENT DOCUMENTS

| | | | |
|---|---|---|---|
| 2,909,584 | 10/1959 | Parks . | |
| 3,963,673 | 6/1976 | D'Angelo et al. | 525/331.7 |
| 4,074,033 | 2/1978 | Wolinski et al. | 525/387 |
| 4,140,818 | 2/1979 | Dave . | |
| 4,166,892 | 9/1979 | Maeda et al. | 525/331.7 |
| 4,226,952 | 10/1980 | Halassa et al. | 525/192 |
| 4,260,661 | 4/1981 | Walters et al. | 524/583 |
| 4,307,204 | 12/1981 | Vidal | 521/140 |
| 4,316,971 | 2/1982 | Rim et al. | 525/309 |
| 4,334,043 | 6/1982 | Groepper | 525/370 |
| 4,365,086 | 12/1982 | McKellin et al. | 525/331.7 |
| 4,575,522 | 3/1986 | Breach et al. | 524/530 |
| 4,788,229 | 11/1988 | Bohm et al. | 524/519 |

FOREIGN PATENT DOCUMENTS

| | | |
|---|---|---|
| 0144805 | 6/1985 | European Pat. Off. . |
| 1233550 | 10/1960 | France . |
| 2434839 | 3/1980 | France . |
| 51-137740 | 11/1976 | Japan . |
| 55-104335 | 8/1980 | Japan . |
| 781040 | 8/1957 | United Kingdom . |
| 83/00488 | 2/1983 | World Int. Prop. O. . |

OTHER PUBLICATIONS

WPI, File Supplier, AN=81-74647D; Derwent Publications, Ltd., London, GB & JP-A-56 107 408 (Hitachi), 26-08-1981, (Abstract).
WPI, File Supplier, AN=77-05165Y; Derwent Publications, Ltd., London, GB & SU-A 502 915 (Chuvash Univ), 06-07-1976, (Abstract).
WPIL, File Supplier, AN=85-021100, Derwent Publications, Ltd., London, GB.
WPIL, File Supplier, AN=75-117E, Derwent Publications, Ltd., London, GB.

*Primary Examiner*—Allan M. Lieberman
*Attorney, Agent, or Firm*—Stevens, Davis, Miller & Mosher

[57] ABSTRACT

In a process of crosslinking a rubber compound with the usage of an organic peroxide as the crosslinking agent, is incorporated to the rubber compound in an amount of 0.5–20 parts by weight per 100 parts of a rubber substrate a compound selected from imidazole type compounds, thiourea type compounds, thiazole type compounds, thiuram type compounds, dithiocarbamate type compounds, phenol type compounds, triazole type compounds and amine type compounds. The process results no surface tackiness of the rubber product crosslinked in the presence of oxygen.

13 Claims, No Drawings

METHODS FOR PRODUCTION OF CROSSLINKED RUBBER PRODUCTS

BACKGROUND OF THE INVENTION

This invention relates to a process for preparing rubber products which comprises crosslinking rubber in the presence of oxygen such as in air or the like with the use of an organic peroxide as a crosslinking agent.

Crosslinked rubber products prepared with the use of an organic peroxide as the crosslinking agent of rubber have excellent properties such as high heat aging resistance, low compression set, decreased staining to metal or coated metal sheet, easy production of colored rubber products which give less color change during crosslinking or after usages for a long period in comparison with sulfur crosslinked products, and have hitherto been used for the production of parts for automobiles, industrial parts, building rubber materials, electrical insulating materials and the like. However, in the process for producing crosslinked rubber products with the use of organic peroxides, processes to accomplish crosslinking under air free atmosphere, e.g. within molds of heat processes or injection molding machines or in fused salt baths (continuous crosslinking method named LCM) or the like, have been employed. Heating apparatuses working in the presence of air such as hot-air heaters, high-frequency heaters or fluidized bed heaters have not been employed. The explanation is found in the fact that when crosslinking with an organic peroxide is carried out by using a heater in the presence of air, the surface of the resulting crosslinked rubber product will become extensively tacky and thus the product will lose its commercial value. Further, when crosslinking is carried out by using a steam vulcanizing autoclave, it is necessary to replace air in the autoclave with steam of the heating source and to remove the air, which causes restriction for practical operations, especially for batchwise autoclave crosslinking.

Furthermore, as for the field of rubber foams (rubber sponges), the rubber foams prepared by the use of sulfur as a crosslinking agent are extensively used in various sponge products for automobile, building and the like. However, it has been desired to improve the properties of these foams such as heat aging resistance, compression set, staining to coated metal sheet, discoloration or color changes of colored sponges and the like.

These problems needing improvements are caused by the use of sulfur as the crosslinking agent and thus they can be solved by the use of an organic peroxide in place of sulfur as the crosslinking agent.

However, most of the rubber foams are produced in the presence of oxygen such as air. Above all, for continuous production processes in which crosslinking and foaming are carried out swiftly in a short time, the use of a hot-air heater, a high frequency heater or the like generally prevails. These rubber-foam products crosslinked with an organic peroxide in the presence of oxygen will become extensively tacky on their surfaces just link the aforementioned non-foamed rubber products. Thus, these products not only have no commercial value but also adhere to conveyer belts or rolls during their production processes and interfere with the production of their articles.

As a method of preventing the tacky surfaces of the crosslinked rubber products, there are disclosed methods in which the surface of a non-crosslinked formed article is preliminarily treated with a special agent, and the treated article is then subjected to crosslinking (U.S. Pat. No. 4,334,043 and EP-A No. 73,037). These methods require the removal of the surface treating agent. However, particularly in products having complicated shapes, it is difficult to wash off the agent completely, and the washing procedure will cause another problem that of treating the waste water. Therefore, such methods are not available for practical use.

Accordingly, it has been hitherto recognized that crosslinking with an organic peroxide is not done in the presence of oxygen. Such a recognition has been a matter of common knowledge in the art of manufacturing rubber articles.

This invention is to provide a process for producing novel rubber products crosslinked by organic peroxides in the presence of oxygen which provide a tack-free surface without the use of surface treating agents.

SUMMARY OF THE INVENTION

This invention relates to a process for producing a crosslinked rubber product with an organic peroxide as a crosslinking agent, which comprises, for preventing the adhesion of the surface of a crosslinked rubber article produced by crosslinking with the organic peroxide in the presence of oxygen, the use of a rubber compound containing at least one or more of the compounds selected from the following compounds (a)–(h):

(a) imidazole compounds,
(b) thiourea compounds,
(c) thiazole compounds,
(d) thiuram compounds,
(e) dithiocarbamate compounds,
(f) phenol compounds,
(g) triazole compounds, and
(h) amine compounds.

This invention is now explained in detail below.

DETAILED DESCRIPTION OF THE INVENTION

The rubber compositions used in this invention require at least 3 components of a rubber substrate, an organic peroxide and, as the essential point of this invention, an additive for preventing the tacky surface of a crosslinked product, that is, at least one compound selected from the aforementioned compounds (a)–(h) to produce non-foamed rubber products. The rubber compound for the purpose of producing foamed rubber products requires at least four components in which a blowing agent is added to the aforementioned three components.

As the rubber usable herein, there may be used without limitation any rubbers capable of crosslinking with an organic peroxide including styrene-butadiene rubbers, ethylene-α-olefin rubbers, chloroprene rubbers, acrylonitrile-butadiene rubbers, ethylene-acrylic acid ester rubbers, silicone rubbers, modified products of a mixture of a silicone rubber and an ethylene-α-olefin rubber. Among these, ethylene-α-olefin rubbers such as ethylene-α-olefin copolymers, and ethylene-α-olefin-non-conjugated diene copolymers are most typical and important, are excellent in weather resistance, heat resistance, ozone resistance and other properties and occupy larger proportions in rubber foams.

As the α-olefins in the ethylene-α-olefin copolymers and ethylene-α-olefin-non-conjugated diene copolymers, there are mentioned propylene, 1-butene, 1-hexene, 1-decene, 1-heptene and the like. As the non-conjugated diene species in the ethylene-α-olefin-non-conjugated dienes, there are mentioned 1,4-hexadiene, dicyclopentadiene, ethylidene-norbornene and the like.

The organic peroxides usable in this invention includes those of peroxyketal types, hydroperoxide types, dialkyl peroxide types, diacyl peroxide types, peroxyester types and the like. There are mentioned dicumyl peroxide, di-t-butyl peroxide, t-butyl peroxycumene, benzoyl peroxide, 2,5-dimethyl-2,5-di(t-butyl-peroxy)-hexane, lauroyl peroxide and the like. These organic peroxides are selected with regard to the kind of the rubber to be used, safety of handling, odor, crosslinking temperature and the like. The organic peroxide is blended in a proportion of 0.5-20 parts by weight, more preferably 1-10 parts by weight, per 100 parts by weight of the rubber substrate. The amount of the organic peroxide may be varied depending on properties of a crosslinked rubber product to be produced, if necessary.

The typical additives for preventing tackiness in this invention include imidazole compounds such as 2-mercaptobenzimidazole, 2-mercaptomethylbenzimidazole, a zinc salt of 2-mercaptobenzimidazole and the like; thiourea compounds such as thiocarbanilide (N,N'-diphenylthiourea), N,N'-diethylthiourea, ethylene thiourea (2-mercaptoimidazoline) and the like; thiazole compounds such as 2-mercaptobenzothiazole, a zinc salt of 2-mercaptobenzothiazole, dibenzothiazyl disulfide and the like; thiuram compounds such as tetramethylthiuram disulfide, tetraethylthiuram disulfide, dipentamethylenethiuram tetrasulfide and the like; dithiocarbamate compounds such as zinc dibutyldithiocarbamate, nickel dibutyldithiocarbamate and the like; phenol compounds such as 2-t-butyl-6-(3'-t-butyl-5'-methyl-2'-hydroxybenzyl)-4-methylphenylacrylate, 2,6-di-t-butyl-4-methylphenol, tetrakis-[methylene-3-(3',5'-di-t-butyl-4'-hydroxyphenol)-propionate]-methane, 2,2'-methylene-bis(4-methyl-6-t-butylphenol) and the like; triazole compounds such as benzotriazole, tolyltriazole and the like; and amine compounds such as poly-(2,2,4-trimethyl-1,2-dihydroquinoline, N,N'-di-2-naphthyl-p-phenylenediamine, N-phenyl-N'-isopropyl-p-phenylenediamine and the like.

Among the aforementioned compounds (a)-(h), the imidazole compounds (a) and the thiourea compounds (b) are particularly preferred. The imidazole compounds and the thiourea compounds are preferred in the improvement of surface tackiness of rubber products and excellent in other physical properties of the rubber products. They also exhibit preferred properties in the processing of rubber compounds.

These compounds (a)-(h), as being well-known, are used as sulfur vulcanizing accelerators, age resisters or the like in the production of rubber articles. But, there has not hitherto been known in the art the fact that the effect of preventing the tackiness of the surface of the crosslinked products has been achieved with the restricted crosslinking agent, that is, an organic peroxide under the restricted crosslinking condition of in the presence of oxygen. The anti-tackiness agents are limited to the aforementioned compounds (a)-(h), and particularly preferably, to the compounds (a) and (b). Other compounds may cause such problems that crosslinking is inhibited, excellent properties of the crosslinking with the organic peroxide are damaged, etc. In general, when a rubber compound has lower viscosity and/or an organic peroxide having a higher temperature of half-life period and slower crosslinking rate is used as a crosslinking agent and/or a rubber substrate having a lower crosslinking efficiency for an organic peroxide, the compounds (a)-(h) are preferably used in a larger amount. On the other hand, when these compounds are used in excessively large amount, the problems such as blooming on standing the rubber compound that is not crosslinked or the crosslinked rubber product or the heightening of the formulation price will happen. Thus, the amount of the compounds should be used in consideration of these points.

As the anti-tackiness additives in a rubber composition of this invention, there are used at least one or more of compounds selected from the aforementioned compounds (a)-(h) in a proportion of 0.5-20 parts by weight, preferably 1-10 parts by weight, more preferably 2.5-10 parts by weight per 100 parts by weight of a rubber substrate. The amount to be added is considerably higher than that of conventional additives such as accelerators and age resisters.

As the blowing agent of this invention, there are mentioned N,N'-dinitrosopentamethylenetetramine, azodicarbonamide, azobisisobutyronitrile, benzene sulfonyl hydrazide, p,p'-oxybis(benzene sulfonyl hydrazide), toluene sulfonyl hydrazine, sodium hydrogen carbonate, ammonium hydrogen carbonate, ammonium carbonate and the like, which are used 0.1-25 parts by weight, preferably 1-15 parts by weight, per 100 parts by weight of a rubber substrate.

In the aforementioned rubber compound used in this invention, there may be added conventional and well-known crosslinking coagents for improving the crosslinking efficiency in the crosslinking with the organic peroxide, which coagents include p,p'-dibenzoylquinone dioxime, p-quinone dioxime, triallyl cyanurate, sulfur, ethyleneglycol dimethacrylate, N,N'-m-phenylene bismaleimide, triallyl isocyanurate, trimethylolpropane trimethacrylate and the like.

Furthermore, there may be added other various additives well-known in the rubber art such as reinforcing fillers, softeners, plasticizers, processing aids, age resisters, anti-oxidants, blowing promoters, flame-retardants, coloring agents, zinc oxide, stearic acid, calcium oxide and the like, if necessary.

As the reinforcing fillers, there may be used, for example, carbon black, talc, clay, calcium carbonate, silica, aluminum hydroxide, magnesium hydroxide and the like.

The rubber composition usable in this invention is prepared by kneading a rubber substrate, an organic peroxide and a compound for preventing tackiness of the crosslinked product of this invention in addition to various additives such as the aforementioned fillers and the like, with the use of a kneader such as Banbury mixer, a kneader mixer, a mixing roll or the like.

The uncrosslinked rubber composition obtained by the above-mentioned mixing is formed into a desired molded article, the molding being carried out by a conventional appropriate process well-known in the art such as using an extruder, a roll or the like.

The molded article has no such limitation that only a air-free heater like a conventional heat press or a salt bath (LCM) may be usable as vulcanizing apparatus, and thus crosslinking or crosslinking and blowing can be carried out with the use of various air-containing heaters such as a hot air heater, a high frequency heater, a fluidized bed heater and the like. Also, in a steam vulcanizing autoclave in which air within the autoclave hitherto had to be replaced with steam of the heating source, it is possible to carry out crosslinking without replacement of air with steam mentioned above. Furthermore, crosslinking or crosslinking and blowing can be accomplished with a combination of two or more of heaters such as a hot air heater and a high frequency heater, if necessary.

The rubber compound used in this invention can be processed into a crosslinked rubber article with the use of the so-called continuous vulcanizing process by the interlock of an extruder calender roll or the like and one of the aforementioned heaters which has been practically impossible to use in the conventional technique.

Crosslinking temperatures and crosslinking times are selected in consideration of the properties of the rubber compound to be used and the physical properties thereof after crosslinking.

Thus, according to this invention, it is possible practically to use various air-containing heaters in the production of a rubber article crosslinked with an organic peroxide, and any limitation which has been hitherto present in heaters used for crosslinking disappears. It is significant that, according to this invention, rubber articles having no surface tackiness can be produced by continuous vulcanization with the use of a hot air heater, a high frequency heater or the like in which rubber articles crosslinked with an organic peroxide could not be produced by conventional techniques because of inhibition by oxygen. Above all, it is very significant that, according to this invention, the production of rubber foams crosslinked with an organic peroxide can be made possible with the use of a continuous heater in which a series of molding, crosslinking and blowing processes are carried out continuously.

By using this invention, various rubber articles such as weatherstrips, building gaskets, various sponges for sealing, heat resistant sheets and the like which utilize the characteristics of crosslinking with an organic peroxide can be produced by crosslinking in the presence of oxygen.

This invention is now explained with reference to Examples below. These Examples are not intended to limit the invention.

EXAMPLES

Examples 1-14, Comparative Example 1

Table 1 shows Examples, in which representatives of the compounds for preventing the surface tackiness of the crosslinked articles according to this invention were added, respectively, in a proportion per 100 parts by weight of ethylene-propylene rubber.

Kneading was carried out with a Banbury mixer and a mixing roll. The resulting mixture was formed into a tape having a thickness of 2 mm and a width of 20 mm with an extruder, and crosslinking was carried out at 200° C. in a hot air oven for 5 minutes. The crosslinked tape was subjected to tensile test and hardness test in accordance with JIS-K6301. The measurements and the observation results of the surface condition of the crosslinked product obtained are listed in Table 2.

From these results, it can be appreciated that tackiness of the surface of the crosslinked products will not be observed with the addition of compounds for preventing surface tackiness according to this invention and thus crosslinked rubber articles can be produced with an air-containing heater such as a hot air heater or the like which had hitherto been impossible to use practically.

On the other hand, in Comparative Example, it was also recognized that the surface of the product became very tacky as described in previous reports.

TABLE 1

| | | Comparative Example 1 | Example 1 | Example 2 | Example 3 | Example 4 | Example 5 | Example 6 | Example 7 |
|---|---|---|---|---|---|---|---|---|---|
| (1) | Ethylene-propylene rubber | 100 | 100 | 100 | 100 | 100 | 100 | 100 | 100 |
| | Zinc oxide | 5 | 5 | 5 | 5 | 5 | 5 | 5 | 5 |
| | Stearic acid | 1 | 1 | 1 | 1 | 1 | 1 | 1 | 1 |
| | MAF black | 80 | 80 | 80 | 80 | 80 | 80 | 80 | 80 |
| (2) | Paraffinic oil | 120 | 120 | 120 | 120 | 120 | 120 | 120 | 120 |
| | 2-Mercaptobenzimidazole | | 5 | | | | | | |
| | Zinc salt of 2-mercaptobenzimidazole | | | 5 | | | | | |
| | 2-Mercaptobenzothiazole | | | | 5 | | | | |
| | Zinc salt of 2-Mercaptobenzothiazole | | | | | 5 | | | |
| | 2-Mercaptoimidazoline | | | | | | 5 | | |
| | Thiocarbanilide | | | | | | | 5 | |
| | Nickle dibutyldithiocarbamate | | | | | | | | 5 |
| | 2-t-Butyl-6-(3'-t-butyl-5'-methyl-2'-hydroxybenzyl)-4-methylphenyl acrylate | | | | | | | | |
| | Bis[2-methyl-4-(3-n-alkylthiopropionyloxy)-5-t-butylphenyl]-sulfide | | | | | | | | |
| | Tetrakis-[methylene-3-(3',5'-di-t-butyl-4'-hydroxyphenol)-propionate]-methane | | | | | | | | |
| | Tolyl triazole | | | | | | | | |
| | Poly(2,2,4-trimethyl-1,2-dihydroxyquinoline | | | | | | | | |
| | N,N'-di-2-naphthyl-p-phenylene diamine | | | | | | | | |
| | Dipentamethylene thiuram tetrasulfide | | | | | | | | |
| | Dicumyl peroxide/ethylene glycol dimethacrylate/calcium oxide | 1/2/5 | 4/2/5 | 4/2/5 | 4/2/5 | 4/2/5 | 4/2/5 | 4/2/5 | 4/2/5 |

TABLE 1-continued (Numerals in the table is represented based on part by weight)

| | | Example | | | | | | |
|---|---|---|---|---|---|---|---|---|
| | | 8 | 9 | 10 | 11 | 12 | 13 | 14 |
| (1) | Ethylene-propylene rubber | 100 | 100 | 100 | 100 | 100 | 100 | 100 |
| | Zinc oxide | 5 | 5 | 5 | 5 | 5 | 5 | 5 |
| | Stearic acid | 1 | 1 | 1 | 1 | 1 | 1 | 1 |
| | MAF black | 80 | 80 | 80 | 80 | 80 | 80 | 80 |
| (2) | Paraffinic oil | 120 | 120 | 120 | 120 | 120 | 120 | 120 |
| | 2-Mercaptobenzoimidazole | | | | | | | |
| | Zinc salt of 2-mercapto-benzimidazole | | | | | | | |
| | 2-Mercaptobenzothiazole | | | | | | | |
| | Zinc salt of 2-Mercaptobenzothiazole | | | | | | | |
| | 2-Mercaptoimidazoline | | | | | | | |
| | Thiocarbanilide | | | | | | | |
| | Nickle dibutyldithiocarbamate | | | | | | | |
| | 2-t-Butyl-6-(3'-t-butyl-5'-methyl-2'-hydroxybenzyl)-4-methylphenyl acrylate | 5 | | | | | | |
| | Bis[2-methyl-4-(3-n-alkylthio-propionyloxy)-5-t-butylphenyl]-sulfide | | 5 | | | | | |
| | Tetrakis-[methylene-3-(3',5'-di-t-butyl-4'-hydroxyphenol)-propionate]-methane | | | 5 | | | | |
| | Tolyl triazole | | | | 5 | | | |
| | Poly(2,2,4-trimethyl-1,2-dihydroxy-quinoline | | | | | 5 | | |
| | N,N'-di-2-naphthyl-p-phenylene diamine | | | | | | 5 | |
| | Dipentamethylene thiuram tetrasulfide | | | | | | | 2.5 |
| | Dicumyl peroxide/ethylene glycol dimethacrylate/calcium oxide | 4/2/5 | 4/2/5 | 4/2/5 | 4/22/5 | 4/2/5 | 4/2/5 | 4/2/5 |

(1) $ML_{1+4}$ (121° C.) = 65, Ethylene/propylene ratio = 70/30, Nonconjugated polyene species: Ethylene-norbornene, Iodine value = 12.
(2) Aniline point = 144° C., $C_A$ = 0%, $C_N$ = 27%, $C_p$ = 74%, viscosity/specific gravity ratio = 0.7942.

TABLE 2

| | Comparative Example | Example | | | | | | | | | | | | | |
|---|---|---|---|---|---|---|---|---|---|---|---|---|---|---|---|
| | 1 | 1 | 2 | 3 | 4 | 5 | 6 | 7 | 8 | 9 | 10 | 11 | 12 | 13 | 14 |
| Tensile strength $T_B$ [kg/cm$^2$] | 84 | 77 | 81 | 70 | 62 | 62 | 80 | 70 | 74 | 69 | 75 | 80 | 64 | 66 | 79 |
| Elongation $E_b$ [%] | 560 | 660 | 600 | 630 | 610 | 620 | 720 | 780 | 660 | 670 | 690 | 690 | 740 | 810 | 780 |
| Hardness Hs [JIS-A] | 38 | 37 | 37 | 36 | 36 | 36 | 37 | 35 | 36 | 35 | 36 | 37 | 35 | 35 | 36 |
| Surface condition | VP | E | E | G | G | E | E | G | G | G | G | G | G | G | G |

Surface condition
E (Excellent): No tackiness of the surface of the crosslinked product is recognized;
G (Good): The crosslinked product has little tackiness on its surface and can be applied for practical use;
P (Poor): The crosslinked product has considerable tackiness on its surface and cannot be applied for practical use;
VP (Very poor): The crosslinked product has high tackiness.

Examples 15-19, Comparative Examples 2-6

Table 3 shows Examples, in which various organic peroxides were used as the crosslinking agent, respectively, in a proportion shown in the table per 100 parts by weight of ethylene-propylene rubber.

The tests were carried out in the same manner as in Example 1. The physical properties and the observation results are shown in Table 4.

From these Examples, it is understood that the compounds for preventing the surface tackiness maintain their effectiveness without limitation by the organic peroxide species.

Examples 20-25, Comparative Examples 7-12

Table 5 shows Examples of formulations in which various fillers were used, respectively, in a proportion shown in the table per 100 parts by weight of ethylene-propylene rubber as well as Comparative Examples.

The tests were carried out in the same manner as in Example 1. The results are listed in Table 6.

From these results, it is understood that according to this invention organic peroxide crosslinked products can be obtained with the use of an air-containing heater such as a hot air heater or the like without regard to black or white fillers. Further, various kinds of colored rubber articles can be produced, if necessary, by adding coloring agents such as pigments or the like to the white formulations.

TABLE 3

| | | Comparative Example | | | | | Examples | | | | |
|---|---|---|---|---|---|---|---|---|---|---|---|
| | | 2 | 3 | 4 | 5 | 6 | 15 | 16 | 17 | 18 | 19 |
| (1) | Ethylene-propylene rubber | 100 | 100 | 100 | 100 | 100 | 100 | 100 | 100 | 100 | 100 |
| | Zinc oxide | 5 | 5 | 5 | 5 | 5 | 5 | 5 | 5 | 5 | 5 |
| | Stearic acid | 1 | 1 | 1 | 1 | 1 | 1 | 1 | 1 | 1 | 1 |
| | MAF black | 80 | 80 | 80 | 80 | 80 | 80 | 80 | 80 | 80 | 80 |
| (2) | Paraffinic oil | 100 | 100 | 100 | 100 | 100 | 100 | 100 | 100 | 100 | 100 |
| | 2-Mercaptobenzoimidazole | | | | | | 5 | 5 | 5 | 5 | 5 |
| | Dicumyl peroxide | 2.7 | | | | | 2.7 | | | | |
| | 2,5-Dimethyl-2,5-di(t-butyl-peroxy)-hexane | | 2.9 | | | | | 2.9 | | | |
| | $\alpha,\alpha'$-Bis-t-butylperoxyisopropyl-benzene | | | 1.69 | | | | | 1.69 | | |
| | 1,1-Bis-t-butylperoxy-3,3,5-trimethylcyclohexane | | | | 3.02 | | | | | 3.02 | |
| | n-Butyl-4,4-bis-t-butylperoxyverilate | | | | | 3.34 | | | | | 3.34 |
| | Ethylene glycol dimethacrylate | 2 | 2 | 2 | 2 | 2 | 2 | 2 | 2 | 2 | 2 |
| | Calcium oxide | 5 | 5 | 5 | 5 | 5 | 5 | 5 | 5 | 5 | 5 |

TABLE 4

| | Comparative Example | | | | | Example | | | | |
|---|---|---|---|---|---|---|---|---|---|---|
| | 2 | 3 | 4 | 5 | 6 | 15 | 16 | 17 | 18 | 19 |
| Tensile strength $T_B$ [kg/cm$_2$] | 102 | 109 | 90 | 104 | 74 | 92 | 84 | 71 | 91 | 57 |
| Elongation $E_B$ [%] | 630 | 590 | 670 | 620 | 450 | 740 | 710 | 820 | 800 | 600 |
| Hardness Hs [JIS-A] | 41 | 42 | 42 | 42 | 44 | 42 | 42 | 42 | 42 | 42 |
| Surface condition | P | P | P | P | P | E | E | E | E | E |

TABLE 5

| | | Comparative Example | | | | | | Example | | | | | |
|---|---|---|---|---|---|---|---|---|---|---|---|---|---|
| | | 7 | 8 | 9 | 10 | 11 | 12 | 20 | 21 | 22 | 23 | 24 | 25 |
| (3) | Ethylene-propylene Rubber | 100 | 100 | 100 | 100 | 100 | 100 | 100 | 100 | 100 | 100 | 100 | 100 |
| | Zinc oxide | 5 | 5 | 5 | 5 | 5 | 5 | 5 | 5 | 5 | 5 | 5 | 5 |
| | Stearic acid | 1 | 1 | 1 | 1 | 1 | 1 | 1 | 1 | 1 | 1 | 1 | 1 |
| | Aluminum hydroxide | 120 | | | | | | 120 | | | | | |
| | Calcium carbonate | | 120 | | | | | | 120 | | | | |
| | Calcined clay | | | 120 | | | | | | 120 | | | |
| | Talc | | | | 120 | | | | | | 120 | | |
| | Silica | | | | | 50 | | | | | | 50 | |
| | FET black | | | | | | 50 | | | | | | 50 |
| (2) | Paraffinic oil | 30 | 30 | 30 | 30 | 40 | 40 | 30 | 30 | 30 | 30 | 40 | 40 |
| | Diethylene glycol | | | | 2 | | | | | | | 2 | |
| | 2-Mercaptobenzimidazole | | | | | | | 5 | 5 | 5 | 5 | 5 | 5 |
| | Dicumyl peroxide | 2.7 | 2.7 | 2.7 | 2.7 | 2.7 | 2.7 | 2.7 | 2.7 | 2.7 | 2.7 | 2.7 | 2.7 |
| | Ethylene glycol dimethacrylate | 2 | 2 | 2 | 2 | 2 | 2 | 2 | 2 | 2 | 2 | 2 | 2 |
| | Calcium oxide | 5 | 5 | 5 | 5 | 5 | 5 | 5 | 5 | 5 | 5 | 5 | 5 |

(3) $ML_{1+4}$ (100° C.) = 35, Ethylene/propylene ratio = 80/20, Non-conjugated polyene species: Ethylidene-norbornene, Iodine value = 12.

TABLE 6

| | Comparative Example | | | | | | Example | | | | | |
|---|---|---|---|---|---|---|---|---|---|---|---|---|
| | 7 | 8 | 9 | 10 | 11 | 12 | 20 | 21 | 22 | 23 | 24 | 25 |
| Tensile strength $T_B$ [kg/cm$^2$] | 65 | 74 | 72 | 91 | 142 | 131 | 54 | 67 | 73 | 90 | 126 | 121 |
| Elongation $E_B$ [%] | 600 | 610 | 680 | 720 | 600 | 440 | 660 | 680 | 700 | 710 | 600 | 540 |
| Hardness Hs [JIS-A] | 63 | 63 | 66 | 68 | 66 | 60 | 62 | 62 | 66 | 69 | 64 | 61 |
| Surface condition | P | P | P | P | P | P | E | E | G | G | G | E |

Examples 26–27, Comparative Examples 13–14

Table 7 shows Examples in the case of styrene-butadiene rubber (SBR) and acrylonitrile-butadiene rubber (NBR).

The tests were carried out in the same manner as in Example 1. The test results thus obtained are listed in Table 8.

From these Examples, it is understood that when a compound for preventing the surface tackiness of this invention is added to a rubber other than ethylenepropylene rubber which is capable of crosslinking with an organic peroxide, preferred crosslinked rubber products can be produced with the use of an air-containing heater.

This invention can also be applied to the blends of these rubbers.

TABLE 7

|  | Comparative Example | | Example | |
|---|---|---|---|---|
|  | 13 | 14 | 26 | 27 |
| (4) Styrene-butadiene rubber | 100 |  | 100 |  |
| (5) Acrylonitrile-butadiene rubber |  | 100 |  | 100 |
| Zinc oxide | 5 | 5 | 5 | 5 |
| Stearic acid | 1 | 1 | 1 | 1 |
| MAF black | 40 | 40 | 40 | 40 |
| (6) Naphthenic oil | 30 |  | 30 |  |
| Diisodecyl phthalate |  | 30 |  | 30 |
| 2-Mercaptobenzimidazole |  |  | 5 | 5 |
| Dicumyl peroxide | 2 | 2.7 | 2 | 2.7 |
| Ethylene glycol dimethacrylate | 2 | 2 | 2 | 2 |
| Calcium oxide | 5 | 5 | 5 | 5 |

(4) Styrene content: 23.5% by weight, $ML_{1+4}$ (100° C.) = 52;
(5) Acrylonitrile content: 33% by weight, $ML_{1+4}$ (100° C.) = 78;
(6) Aniline point: 80° C., $C_A$ = 18%, $C_N$ = 41%, $C_p$ = 41%, Viscosity/specific gravity ratio = 0.882

TABLE 8

|  | Comparative Example | | Example | |
|---|---|---|---|---|
|  | 13 | 14 | 26 | 27 |
| Tensile strength $T_B$ [kg/cm²] | 87 | 87 | 74 | 86 |
| Elongation $E_B$ [%] | 180 | 140 | 170 | 140 |
| Hardness Hs [JIS-A] | 60 | 64 | 63 | 64 |
| Surface condition | P | P | G | E |

Examples 28–33, Comparative Examples 15–20

Table 9 shows Examples together with Comparative Examples of the formulations in which the process oil and the organic peroxide were varied, respectively, in a proportion per 100 parts by weight of the ethylenepropylene rubber.

Kneading and forming was carried out in the same manner as in Example 1. Uncrosslinked tapes thus formed were heated and crosslinked at 160° C. for 30 minutes in hot air heater or in a steam vulcanizing autoclave without air purging under the steam pressure of 5.3 kg/cm². For comparison therewith, crosslinking was carried out with a hot press apparatus at 160° C. Crosslinked products were subjected to tensile tests and hardness tests as in Example 1. The surface condition was also observed. The results are listed in Table 10.

These results indicates that the compounds for preventing surface tackiness are effective without regard to the amounts of various additives such as process oils, organic peroxides or the like. It is also understood that even if a steam vulcanizing autoclave is used in which air hitherto had to be replaced with steam of the heating source for obtaining a practically available article, crosslinking can be accomplished without such restriction in an improved productivity.

TABLE 9

|  | Comparative Example | | | Example | | | Comparative Example | | | Example | | |
|---|---|---|---|---|---|---|---|---|---|---|---|---|
|  | 15 | 16 | 17 | 28 | 29 | 30 | 18 | 19 | 20 | 31 | 32 | 33 |
| (1) Ethylene-propylene rubber | 100 | 100 | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 | 1 | 1 |
| MAF black | 80 | 80 | 80 | 80 | 80 | 80 | 80 | 80 | 80 | 80 | 80 | 80 |
| (2) Paraffinic oil | 60 | 60 | 60 | 60 | 60 | 60 | 120 | 120 | 120 | 120 | 120 | 120 |
| 2-Mercaptobenzimidazole |  |  |  | 5 | 5 | 5 |  |  |  | 5 | 5 | 5 |
| Dicumyl peroxide | 2.7 | 5.4 | 6.75 | 2.7 | 5.4 | 6.75 | 2.7 | 5.4 | 6.75 | 2.7 | 5.4 | 6.75 |
| Ethylene glycol dimethacrylate | 2 | 2 | 2 | 2 | 2 | 2 | 2 | 2 | 2 | 2 | 2 | 2 |
| Calcium oxide | 5 | 5 | 5 | 5 | 5 | 5 | 5 | 5 | 5 | 5 | 5 | 5 |

TABLE 10

| Crosslinking method |  | Comparative Example | | | Example | | | Comparative Example | | | Example | | |
|---|---|---|---|---|---|---|---|---|---|---|---|---|---|
|  |  | 15 | 16 | 17 | 28 | 29 | 30 | 18 | 19 | 20 | 31 | 32 | 33 |
| Hot air crosslinking | Tensile strength $T_B$ [kg/cm²] | 140 | 146 | 149 | 132 | 146 | 146 | 83 | 98 | 108 | 73 | 97 | 98 |
|  | Elongation $E_B$ [%] | 430 | 300 | 270 | 470 | 340 | 310 | 730 | 550 | 520 | 780 | 640 | 590 |
|  | Hardness Hs [JIS-A] | 56 | 60 | 60 | 56 | 59 | 60 | 34 | 38 | 38 | 36 | 38 | 39 |
|  | Surface condition | V.P | V.P | V.P | E | E | E | V.P. | V.P. | V.P. | E | E | E |
| Steam autoclave crosslinking | Tensile strength $T_B$ [kg/cm²] | 152 | 159 | 163 | 147 | 157 | 161 | 95 | 115 | 122 | 91 | 118 | 116 |
|  | Elongation $E_B$ [%] | 430 | 290 | 260 | 460 | 320 | 290 | 690 | 540 | 500 | 740 | 590 | 540 |
|  | Hardness Hs [JIS-A] | 58 | 61 | 62 | 58 | 62 | 62 | 37 | 40 | 41 | 37 | 40 | 41 |
|  | Surface condition | P | P | P | E | E | E | P | P | P | E | E | E |
| Hot press crosslinking | Tensile strength $T_B$ [kg/cm²] | 158 | 160 | 159 | 153 | 158 | 159 | 99 | 123 | 125 | 104 | 124 | 122 |
|  | Elongation $E_B$ [%] | 420 | 290 | 250 | 460 | 320 | 290 | 700 | 560 | 500 | 790 | 620 | 580 |
|  | Hardness Hs [JIS-A] | 59 | 63 | 64 | 60 | 63 | 64 | 39 | 42 | 43 | 40 | 43 | 44 |
|  | Surface condition | E | E | E | E | E | E | E | E | E | E | E | E |

Examples 34–36, Comparative Examples 21–23

The following formulations were kneaded with a Banbury mixer and a mixing roll into a composition for a rubber foam.

| Formulations | |
|---|---|
| Ethylene-propylene rubber | 100 parts by weight |
| Zinc oxide | 5 |
| Stearic acid | 1 |
| FEF black | 80 |
| Calcium carbonate | 20 |
| Paraffinic oil | 60 |

-continued

| Formulations | |
|---|---|
| Blowing agent | 5 |
| Blowing promoter (urea type) | 0 or 5 |
| Dicumyl peroxide | 2.7 |
| Ethylene glycol dimethacrylate | 2 |
| Calcium oxide | 5 |
| Additive for preventing tackiness (2-mercaptobenzimidazole) | 0 or 2.5 |

The composition for a rubber foam thus obtained was extruded with a screw extruder with 45 mmφ equipped with a ribbon die of a thickness of 5 mm and a width of 20 mm, and then subjected to crosslinking and foaming processes by heating continuously at 230° C. in a hot air heater for 5 minutes.

Table 11 shows the specific gravities of rubber foams after crosslinking and blowing processes and the observation results of their surface conditions.

These Examples indicate that when continuous vulcanization of the composition is carried out with a hot air heater for a rubber foam in which an imidazole type compound, that is, 2-mercaptobenzimidazole, is used as an additive for preventing surface tackiness, rubber foams having no surface tackiness can be obtained without regard to kinds of blowing agents. On the other hand, it was also confirmed that the surface of each rubber foam obtained in Comparative Examples were very tacky as was previously known.

TABLE 11

| | Comparative Example 21 | Example 34 | Comparative Example 22 | Example 35 | Comparative Example 23 | Example 36 |
|---|---|---|---|---|---|---|
| p,p'-oxybis(benzene-sulfonyl hydrazide) | 5 | 5 | — | — | — | — |
| Azodicarbonamide | — | — | 5 | 5 | — | — |
| N,N'-dinitroso-pentamethylene-tetramine | — | — | — | — | 5 | 5 |
| Blowing promoter (urea type) | — | — | 5 | 5 | 5 | 5 |
| 2-Mercaptobenz-imidazole | — | 2.5 | — | 2.5 | — | 2.5 |
| Specific gravity of rubber foam | 0.69 | 0.72 | 0.65 | 0.69 | 0.68 | 0.67 |
| Surface tackiness of rubber foam | VP | E | VP | E | VP | E |

Examples 37–48

Tables 12 and 13 show the result of addition of typical compounds for preventing surface tackiness in the composition for rubber foams of this invention.

The test was carried out in the same way as in Example 34, and the same formulation as in Example 34 was used as a basic formulation. p,p'-oxybis(benzene-sulfonyl hydrazide) was used as the blowing agent, and any blowing promoter was not employed.

The results indicate that when the compositions for rubber foams according to this invention are used, surface tackiness is not recognized on crosslinked rubber foams and thus crosslinked rubber articles can be produced with a air-containing heater such as a hot air heater, in which such a process could not be practically utilized.

TABLE 12

| | Example 37 | Example 38 | Example 39 | Example 40 | Example 41 | Example 42 |
|---|---|---|---|---|---|---|
| Zinc salts of 2-mercaptobezimidazole | 2.5 | — | — | — | — | — |
| 2-Mercaptobenzothiazole | — | 2.5 | — | — | — | — |
| 2-Mercaptoimidazoline | — | — | 2.5 | — | — | — |
| Thiocarbanilide | — | — | — | 2.5 | — | — |
| Nickel dibutyl dithio-carbamate | — | — | — | — | 2.5 | — |
| Dipentamethylenethiuram tetrasulfide | — | — | — | — | — | 2.5 |
| Specific gravity of rubber foam | 0.74 | 0.71 | 0.73 | 0.68 | 0.67 | 0.69 |
| Surface tackiness of rubber foam | E | E | E | E | G | G |

TABLE 13

| | Example 43 | Example 44 | Example 45 | Example 46 | Example 47 | Example 48 |
|---|---|---|---|---|---|---|
| 2-t-Butyl-6-(3'-t-butyl-5'-methyl-2'-hydroxybenzyl)-4-methylphenylacrylate | 2.5 | — | — | — | — | — |
| Bis[2-methyl-4-(3-n-alkylthio-propionyl-oxy)-5-t-butylphenyl]-sulfide | — | 2.5 | — | — | — | — |
| Tetrakis[methylene-3-(3',5'-di-t-butyl-4'-phenol)propionate]-methane | — | — | 2.5 | — | — | — |

TABLE 13-continued

|  | Example 43 | Example 44 | Example 45 | Example 46 | Example 47 | Example 48 |
|---|---|---|---|---|---|---|
| Tolyl triazole | — | — | — | 2.5 | — | — |
| Poly(2,2,4-trimethyl-1,2-dihydroxyquinoline) | — | — | — | — | 2.5 | — |
| N,N'-di-2-naphthyl-p-phenylenediamine | — | — | — | — | — | 2.5 |
| Specific gravity of rubber foam | 0.67 | 0.70 | 0.69 | 0.75 | 0.71 | 0.67 |
| Surface tackiness of rubber foam | G | G | G | G | G | G |

Examples 49–53, Comparative Examples 24–26

Therefore, it is considered that 10 parts by weight is an upper limit in practical use.

TABLE 14

|  | Comparative Example 24 | Example 49 | Example 50 | Example 51 | Comparative Example 25 | Comparative Example 26 | Example 52 | Example 53 |
|---|---|---|---|---|---|---|---|---|
| Iodine value of ethylene-propylene rubber |  |  | 0 |  |  |  | 12 |  |
| Amount of 2-mercapto-benzimidazole (part by weight) | 0 | 2.5 | 5 | 10 | 15 | 0 | 2.5 | 5 |
| Tensile strength $T_B$ [kg/cm²] | 90 | 92 | 88 | 86 | 84 | 111 | 107 | 105 |
| Elongation extension $E_B$ [%] | 420 | 440 | 430 | 450 | 460 | 220 | 220 | 240 |
| Hardness Hs [JIS-A] | 58 | 57 | 58 | 58 | 57 | 66 | 66 | 65 |
| Surface tackiness | VP | G | E | E | E | VP | E | E |
| Blooming phenomenon | None | None | None | Very little | Observed | None | None | None |

Table 14 shows the effect of variation in the amount of 2-mercaptobenzimidazole added as a typical compound for preventing the surface tackiness.

| Formulations |  |
|---|---|
| Ethylene-propylene rubber ML$_{1+4}$ (100° C. = 40, Ethylene/propylene ratio = 50/50, Iodine value = 0 or 12; ENB) | 100 parts by weight |
| Zinc oxide | 5 |
| Stearic acid | 1 |
| MAF black | 80 |
| Paraffinic oil | 40 |
| 2-Mercaptoimidazole | varied |
| Dicumyl peroxide | 4 |
| Ethylene glycol dimethacrylate | 2 |
| Calcium oxide | 5 |

All of the procedures including kneading, forming, vulcanization and measurement of physical properties were carried out in the same manner as in Example 1. Blooming phenomenon was evaluated after standing the crosslinked sample at room temperature for 1 week.

An ethylene-propylene rubber having an iodine value of 0 has a lower crosslinking efficiency in crosslinking with an organic peroxide as compared with that of an ethylene-propylene rubber having an iodine value of 12 and thus exhibits lower tensile strength and hardness and larger elongation. Therefore, it is desirable to use 2-mercaptoimidazole in an appreciably larger amount in the ethylene-propylene rubber having an iodine value of 0 than in the ethylene-propylene rubber having an iodine value of 12. It is preferred to use in an amount of 5 parts by weight or more in the case of the formulation in these Examples. However, when it is used in an excessively large amount, problem of blooming is caused.

We claim:

1. A process for producing a crosslinked rubber product by crosslinking a rubber composition with an organic peroxide by continuous vulcanization with the use of a hot air heater, a high frequency heater or a fluidized bed beater, in the presence of aerial oxygen which contacts directly on the surface of the rubber composition and is present in an amount which causes surface tackiness, which comprises incorporating into the rubber composition to prevent tackiness of the surface of the produce at least one compound selected from the group consisting of the following compounds (a)–(h) in an amount of 2.5–20 parts by weight per 100 parts by weight of rubber:
   (a) 2-mercaptobenzimidazole, 2-mercaptomethylbenzimidazole, a zinc salt of 2-mercaptobenzimidazole;
   (b) thiocarbanilide (N,N'-diphenylthiourea, N,N'-diethylthiourea, ethylenethiourea (2-mercaptomidazoline;
   (c) 2-mercaptobenzothiazole, a zinc salt of 2-mercaptobenzothiazole, dibenzothiazyl disulfide;
   (d) tetramethylthiuram disulfide, tetraethylthiuram disulfide, dipentamethylenethiuram tetrasulfide;
   (e) zinc dibutyldithiocarbamate, nickel dibutyldithiocarbamate;
   (f) 2-t-butyl-6-(3'-t-butyl-5'-methyl-2'-hydroxybenzyl)-4-methylphenylacrylate, 2,6-di-t-butyl-4-methylphenol, tetrakis[methylene-3-(3',5'-di-t-butyl-4'-hydroxyphenol)-propionate]methane, 2,2'-methylene-bis(4-methyl-6-t-butylphenol);
   (g) benzotriazole, tolyltriazole;
   (h) poly-(2,2,4-trimethyl-1,2-dihydroquinoline, N,N'-di-2-naphthyl-p-phenylenediamine, N-phenyl-N'-isopropyl-p-phenylenediamine.

2. A process according to claim 1, wherein a blowing agent is further added.

3. A process according to claim 1, wherein at least one or more of the compounds selected from said compounds (a)–(h) are added in a proportion of 2.5–10 parts by weight, per 100 parts by weight of the rubber substrate.

4. A process according to claim 1, wherein said at least one compound is selected from the group consisting of the compound listed in paragraphs (a) and (b).

5. A process according to claim 2, wherein at least one or more of the compounds selected from said compounds (a)–(h) are added in a proportion of 2.5–10 parts by weight, per 100 parts by weight of the rubber substrate.

6. A process according to claim 2, wherein said at least one compound is selected from the group consisting of the compounds listed in paragraphs (a) and (b).

7. A process according to claim 3, wherein said at least one compound is selected from the group consisting of the compounds listed in paragraphs (a) and (b).

8. A process according to claim 5, wherein said at least one compound is selected from the group consisting of the compounds listed in paragraphs (a) and (b).

9. A process according to claim 1, wherein said at least one compound is selected from the group consisting of the compounds listed in paragraph (a).

10. A process according to claim 2, wherein said at least one compound is selected from the group consisting of the compounds listed in paragraph (a).

11. A process according to claim 9, wherein said compound is 2-mercaptobenzimidazole.

12. A process according to claim 1, wherein said compound is selected from the group consisting of the compounds listed in paragraph (b).

13. A process according to claim 2, wherein said compound is selected from the group consisting of the compounds listed in paragraph (b).

* * * * *